(12) United States Patent
Nagami et al.

(10) Patent No.: US 6,683,874 B1
(45) Date of Patent: Jan. 27, 2004

(54) ROUTER DEVICE AND LABEL SWITCHED PATH CONTROL METHOD USING UPSTREAM INITIATED AGGREGATION

(75) Inventors: Kenichi Nagami, Tokyo (JP); Masaki Minami, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/429,727

(22) Filed: Oct. 29, 1999

(30) Foreign Application Priority Data

Oct. 30, 1998 (JP) ............................................ 10-311370

(51) Int. Cl.[7] .......................... H04L 12/28; H04L 12/56
(52) U.S. Cl. ...................... 370/392; 370/401; 370/396; 370/397; 370/395.2; 370/399; 370/352; 709/238; 709/240; 709/241; 709/242
(58) Field of Search ................................. 370/352, 230, 370/360, 395.21, 401, 468, 392, 396, 397, 398, 399, 393; 709/238, 240, 241, 242

(56) References Cited

U.S. PATENT DOCUMENTS

| | | | | | |
|---|---|---|---|---|---|
| 5,822,319 | A | * | 10/1998 | Nagami | 370/392 |
| 5,996,021 | A | * | 11/1999 | Civanlar et al. | 709/238 |
| 6,009,097 | A | * | 12/1999 | Han | 370/395 |
| 6,104,713 | A | * | 8/2000 | Nagami et al. | 370/392 |
| 6,167,051 | A | * | 12/2000 | Nagami et al. | 370/397 |
| 6,304,577 | B1 | * | 10/2001 | Nagami et al. | 370/395 |
| 6,341,127 | B1 | * | 1/2002 | Katsube et al. | 370/352 |
| 6,351,465 | B1 | * | 2/2002 | Han | 370/395 |
| 6,430,155 | B1 | * | 8/2002 | Davie et al. | 370/232 |
| 6,501,756 | B1 | * | 12/2002 | Katsube et al. | 370/392 |
| 6,501,760 | B1 | * | 12/2002 | Ohba et al. | 370/395.42 |
| 6,515,999 | B1 | * | 2/2003 | Nagami et al. | 370/409 |
| 6,529,958 | B1 | * | 3/2003 | Oba et al. | 709/237 |

OTHER PUBLICATIONS

Vibhavasu Vuppala and Lionel M. Ni (Design of A Scalable IP Router), Jul. 22, 1997.*

* cited by examiner

Primary Examiner—Wellington Chin
Assistant Examiner—Chuong Ho
(74) Attorney, Agent, or Firm—Foley & Lardner

(57) ABSTRACT

A router device and a label switched path control method capable of reducing the number of label switched paths to be set up by using an upstream initiated procedure in which the label allocation starts from an ingress router are disclosed. In the router device, a router identification information of a target router to be set as an egress router if possible is stored in an egress router list at a time of setting up a label switched path from the router device as an ingress router, and a control to set up the label switched path to the target router stored in the egress router list is carried out. Then, a label switched path identification information of the label switched path set up according to the control and an address information to be given to packets that are to be transferred by passing through the target router stored in the egress router list, are stored in correspondence in a routing table, and a routing processing for the packets is carried out according to the label switched path identification information and the address information stored in the routing table.

20 Claims, 16 Drawing Sheets

FIG.2A

| EGRESS ROUTER |
|---|
| R4 |
| R5 |

FIG.2B

| DESTINATION | LSP |
|---|---|
| NETWORK A | #1 |
| NETWORK B | #1 |
| NETWORK C | #2 |
| NETWORK D | #2 |
| R4 | #1 |
| R5 | #2 |

FIG.2C

| EGRESS ROUTER | NETWORK | LSP |
|---|---|---|
| R4 | R4, NETWORK A, NETWORK B | #1 |
| R5 | R5, NETWORK C, NETWORK D | #2 |

FIG.7A

| EGRESS ROUTER |
|---|
| R4 |
| R5 |

FIG.7B

| DESTINATION | LSP |
|---|---|
| NETWORK A | #3 |
| NETWORK B | #3 |
| NETWORK C | #4 |
| NETWORK D | #4 |
| R4 | #3 |
| R5 | #4 |
| R6 | #4 |

FIG.7C

| EGRESS ROUTER | NETWORK | LSP |
|---|---|---|
| R4 | R4, NETWORK A, NETWORK B | #3 |
| R5 | R5, R6, NETWORK C, NETWORK D | #4 |

FIG.9A

| EGRESS ROUTER |
|---|
| R3 |

FIG.9B

| DESTINATION | LSP |
|---|---|
| NETWORK A | #5 |
| NETWORK B | #5 |
| R3 | #5 |
| R4 | #5 |
| R5 | #5 |

FIG.9C

| EGRESS ROUTER | NETWORK | LSP |
|---|---|---|
| R3 | R3, R4, R5, NETWORK A, NETWORK B | #5 |

FIG.10A

| EGRESS ROUTER |
|---|
| R4 |

FIG.10B

| DESTINATION | LSP |
|---|---|
| NETWORK A | #6 |
| NETWORK B | #6 |
| R4 | #6 |
| R5 | #6 |

FIG.10C

| EGRESS ROUTER | NETWORK | LSP |
|---|---|---|
| R4 | R4, R5, NETWORK A, NETWORK B | #6 |

FIG.12A

| EGRESS ROUTER |
|---|
| R5 |

FIG.12B

| DESTINATION | LSP |
|---|---|
| R5 | #7 |
| R6 | #7 |

FIG.12C

| EGRESS ROUTER | NETWORK | LSP |
|---|---|---|
| R5 | R5, R6 | #7 |

FIG.14A

| EGRESS ROUTER |
|---|
| R6 |
| R7 |

FIG.14B

| DESTINATION | LSP |
|---|---|
| R6 | #8 |
| R7 | #9 |
| R8 | #8 |
| R9 | #9 |

FIG.14C

| EGRESS ROUTER | NETWORK | LSP |
|---|---|---|
| R6 | R6, R8 | #8 |
| R7 | R7, R9 | #9 |

FIG.16A

| EGRESS ROUTER ||
|---|---|
| OSPF | BGP |
| R3 | R6 |

FIG.16B

| DESTINATION | LSP |
|---|---|
| NETWORK A | #10 |
| NETWORK B | #10 |
| R3 | #10 |
| R4 | #10 |
| R5 | #10 |
| R6 | #11 |
| R7 | #11 |

FIG.16C

| PROTOCOL | EGRESS ROUTER | NETWORK | LSP |
|---|---|---|---|
| OSPF | R3 | R3, R4, R5, R6, R7, NETWORK A, NETWORK B | #10 |
| BGP | R6 | R6, R7 | #11 |

ROUTER DEVICE AND LABEL SWITCHED PATH CONTROL METHOD USING UPSTREAM INITIATED AGGREGATION

BACKGROUND OF THE INVENTION

1. Field of the Invention

The present invention relates to a router device having a label switching function and a label switched path control method.

2. Description of the Background Art

Recently, the use of the so called Internet as a communication network using IP (Internet Protocol) has spread rapidly, and the traffic amount and the number of connected nodes are increasing rapidly. A communication network using IP such as Internet is called a best effort type communication network in which a router device makes its best effort to try to carry out the IP packet processing, but a transfer quality is not guaranteed so that IP packet loss may occur when traffics are concentrated at the router device. However, there are demands for the guarantee of the transfer quality such as a transfer delay or an IP packet loss rate even in the IP communication network, as in the case of requiring QoS (Quality of Service) or CoS (Class of Service), for example.

With this background, there is a need for a faster/higher performance router device which is a basic constituent element of an IP communication network, especially the Internet. As a technique for fulfilling such needs, the label switching technique has been developed and its standardization is in progress. A label switch router (LSR) based on the label switching technique can realize a high performance packet transfer by transferring layer-3 packets using not only the conventionally used layer-3 address information but also a fixed length label that is set in correspondence to the layer-3 address information.

As a label switching technique based scheme for realizing a faster packet transfer, MPLS (Multi-Protocol Label Switching) scheme has been proposed (see R. Callon, et al., "A Framework for Multiprotocol Label Switching", Internet Draft draft-ietf-mpls-framework-02.txt, November 1997, for example). In MPLS, a specific "label" is assigned to packets belonging to a specific unit of management between label switch routers, an input side label and an output side label are stored in correspondence at each label switch router, and the label switching is carried out by referring to this information, so as to realize a fast packet transfer by omitting the IP processing. For example, in the case where the link layer is ATM, VPI/VCI (Virtual Path Identifier/Virtual Channel Identifier) is used as a label. A route through which packets are label switched will be referred to as a label switched path (LSP).

Here, at a time of generating the label switched path using the label switch router, the following two methods are available.

One method is a topology driven method in which one label switched path is generated for one entry of a routing table. In this method, the label switched paths are always set up for all the entries (all the destinations, for example) of the routing table regardless of the actual traffic state.

Another method is a traffic driven method in which a label switched path is generated when a specific packet arrives, with respect to its source address and destination address. In this method, the label switched path is set up only for a source address and destination address pair for which the packet transfer is actually carried out.

Now, when the application of these methods to the Internet is considered, in the case of using the topology driven method for allocating one label switched path to one entry of the routing table, the Internet backbone currently has approximately 50000 pieces of the routing information so that the required number of label switched paths becomes as much as approximately 50000. Also, in the case of using the traffic driven method for allocating a label switched path to a pair of the source address and the destination address for which the packet transfer is actually carried out, if the current Internet backbone is used, it is known that a considerable number (in a range of 5000 to 10000, for example) number of label switched paths are still required.

When the number of label switched paths is increased as such, many resources will be required for the label switched paths so that the implementation becomes difficult and costly.

Thus the conventional label switching requires to set up a considerable number of label switched paths when the network scale becomes large, so that it has been associated with serious problems regarding implementation and cost.

As a scheme for reducing the number of labels, a scheme called ARIS has been proposed (see A. Viswanathan, et al., "ARIS: Aggregate Route-Based IP Switching", Internet Draft draft-viswanathan-aris-overview-00.txt, March 1997; and N. Feldman, et al., "ARIS Specification", Internet Draft draft-feldman-aris-spec-00.txt, March 1997). This scheme uses a downstream initiated procedure in which the label allocation starts from an egress router.

However, in the case of using an upstream initiated procedure in which the label allocation starts from an ingress router as in the commonly assigned copending U.S. patent application Ser. No. 08/649,514, for example, there has been no known scheme for realizing the reduction of the number of labels.

Note that the reduction of the number of labels can contribute to the reduction of router resources. In particular, in the case of utilizing ATM, the number of labels is given by the number of ATM VCs but not so many ATM VCs can be handled in practice because of the limitations related to the implementation, so that it is important to reduce the number of labels.

SUMMARY OF THE INVENTION

It is therefore an object of the present invention to provide a router device and a label switched path control method capable of reducing the number of label switched paths to be set up and thereby making the device implementation easier.

It is another object of the present invention to provide a router device and a label switched path control method capable of reducing the number of labels by an upstream initiated procedure in which the label allocation starts from an ingress router.

According to one aspect of the present invention there is provided a router device, comprising: a first memory configured to store a router identification information of a target router to be set as an egress router if possible, at a time of setting up a label switched path from the router device as an ingress router; a control unit configured to carry out a control to set up the label switched path to the target router stored in the first memory; a second memory configured to store in correspondence a label switched path identification information of the label switched path set up according to the control by the control unit and an address information to be given to packets that are to be transferred by passing through the target router stored in the first memory; and a routing processing unit configured to carry out a routing processing for the packets according to the label switched path identification information and the address information stored in the second memory.

According to another aspect of the present invention there is provided a label switched path control method at a router device, comprising the steps of: (a) storing a router identification information of a target router to be set as an egress router if possible, in an egress router list, at a time of setting up a label switched path from the router device as an ingress router; (b) carrying out a control to set up the label switched path to the target router stored in the egress router list; (c) storing in correspondence a label switched path identification information of the label switched path set up according to the control by the control unit and an address information to be given to packets that are to be transferred by passing through the target router stored in the egress router list, in a routing table; and (d) carrying out a routing processing for the packets according to the label switched path identification information and the address information stored in the routing table.

According to another aspect of the present invention there is provided a computer usable medium having computer readable program code means embodied therein for causing a computer to function as a router device, the computer readable program code means includes: first computer readable program code means for causing said computer to store a router identification information of a target router to be set as an egress router if possible, at a time of setting up a label switched path from the router device as an ingress router; second computer readable program code means for causing said computer to carry out a control to set up the label switched path to the target router stored by the first computer readable program code means; third computer readable program code means for causing said computer to store in correspondence a label switched path identification information of the label switched path set up according to the control by the second computer readable program code means and an address information to be given to packets that are to be transferred by passing through the target router stored by the first computer readable program code means; and fourth computer readable program code means for causing said computer to carry out a routing processing for the packets according to the label switched path identification information and the address information stored by the third computer readable program code means.

Other features and advantages of the present invention will become apparent from the following description taken in conjunction with the accompanying drawings.

BRIEF DESCRIPTION OF THE DRAWINGS

FIGS. 2A, 2B and 2C are digrams showing exemplary configurations and contents of an egress router list, a routing table, and a network list, respectively, used in the network configuration of FIG. 1.

FIGS. 7A, 7B and 7C are diagrams showing exemplary configurations and contents of an egress router list, a routing table, and a network list, respectively, used in the network configuration of FIG. 6.

FIGS. 9A, 9B and 9C are diagrams showing exemplary configurations and contents of an egress router list, a routing table, and a network list, respectively, used in the network configuration of FIG. 8.

FIGS. 10A, 10B and 10C are diagrams showing another exemplary configurations and contents of an egress router list, a routing table, and a network list, respectively, used in the network configuration of FIG. 8.

FIGS. 12A, 12B and 12C are diagrams showing exemplary configurations and contents of an egress router list, a routing table, and a network list, respectively, used in the network configuration of FIG. 11.

FIGS. 14A, 14B and 14C are diagrams showing exemplary configurations and contents of an egress router list, a routing table, and a network list, respectively, used in the network configuration of FIG. 13.

FIGS. 16A, 16B and 16C are diagrams showing exemplary configurations and contents of an egress router list, a routing table, and a network list, respectively, used in the network configuration of FIG. 15.

DETAILED DESCRIPTION OF THE PREFERRED EMBODIMENTS

Figure 1:
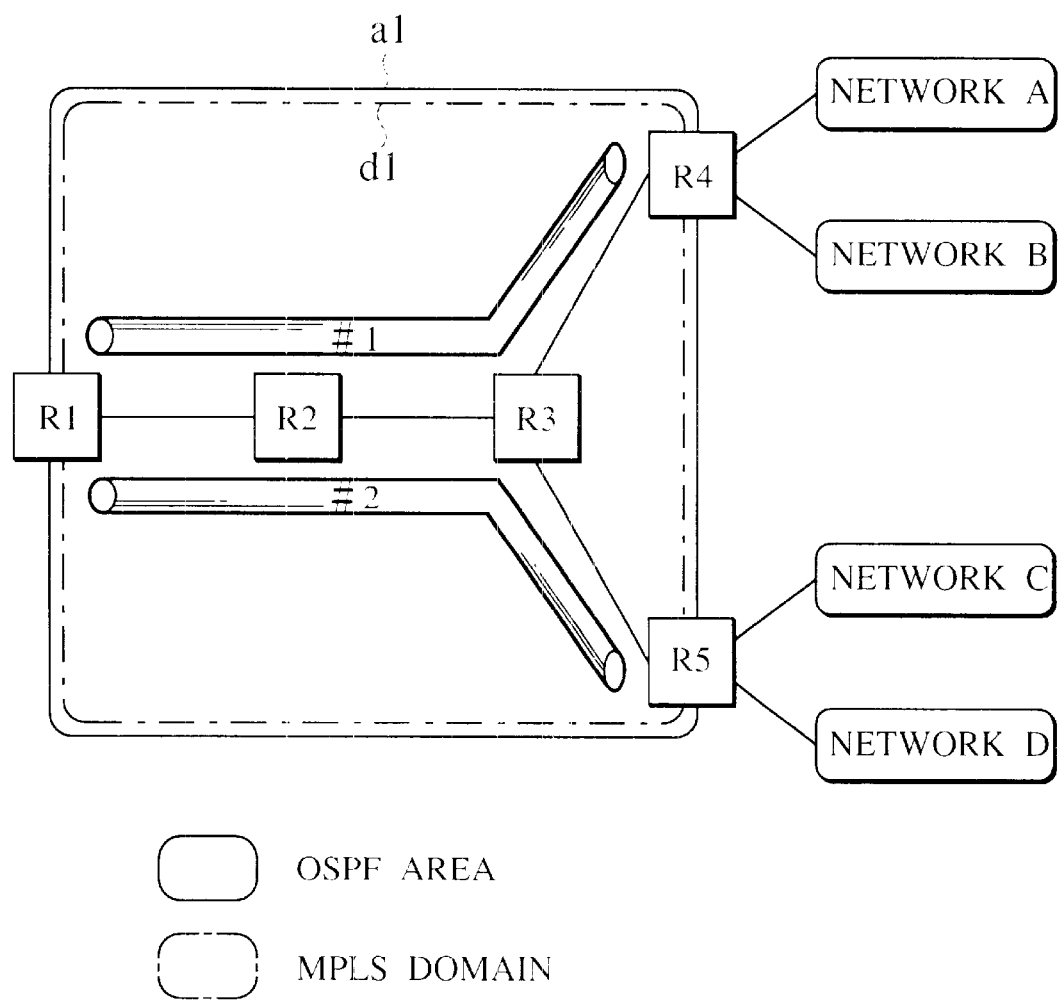
FIG. 1 is a diagram showing a first exemplary network configuration containing a router device according to the first embodiment of the present invention.

Referring now to FIG. 1 to FIGS. 10A, 10B and 10C, the first embodiment of a router device and a label switched path control method according to the present invention will be described in detail.

The first embodiment assumes that OSPF (Open Shortest Path Fast) (see J. Moy, "OSPF Version 2", Internet RFC2328, April 1998, for example) is used as the routing protocol, and is directed to a scheme for generating one label switched path (LSP) from an ingress router to an egress router by using OSPF routing information that is transferred between routers.

In the conventional topology driven scheme, the label switched path is set up for every entry of the routing table so that many label switched paths are required with respect to the egress routers, but according to the present invention, one label switched path is set up with respect to one egress router for (a part or a whole of) entries which shares a route from an ingress router to that egress router among all the entries of the routing table (one label switched path identification information is written into a plurality of entries) so that the number of label switched paths can be reduced effectively.

Note that, in the following description, a router is assumed to be a device having a routing table of the network layer such as IP.

Note also that the ingress router is a router that becomes a starting point of the label switched path, and the egress router is a router that becomes an end point of the label switched path. Routers between the ingress router and the egress router can realize a fast packet transfer without the IP processing.

Now, in order to set up the label switched path, there is a need to ascertain an IP address or a router ID of the egress router at the ingress router. In this first embodiment, the router ID of the egress router is assumed to be manually set up by a system manager or the like (that is, the router ID of the egress router with respect to each ingress router is to be set up for all the ingress routers). Here, it is also possible to set up the router ID of the egress router at each ingress router automatically by using OSPF Opaque LSA, for example.

The egress router that can be recognized from the ingress router is basically a router that exists within a range of the identical OSPF area. For this reason, the label switched path set up is possible when the ingress router and the egress router exist in the same OSPF area. However, in the case where the egress router "b" of another OSPF area with respect to the ingress router "a" is an AS (Autonomous System) border router (ASBR), the existence of this router "b" can be recognized from the ingress router "a" which is a router located inside one OSPF area, so that the label switched path from the router "a" can be set up to the router "b" which is ASBR (the label switched path across two or more OSPF areas can be set up).

On the other hand, apart from the above described above, a range in which the label switched path can be set up is limited to a range of an MPLS (Multi-Protocol Label Switching) domain. Note that when a control for setting up the label switched path beyond a range of the MPLS domain is made, it will end up having the label switched path set up within the range of the MPLS domain rather than having no label switched path set up at all.

Namely, when a control to set up a label switched path to a router device that is preferably set as an egress router if possible is carried out, depending on a relationship between a setting of that router device and a network configuration (especially a range using the identical protocol), there can be cases where the label switched path will not be set up to that router device. However, even in such cases, the label switched path will be (or can be) set up to an intermediate router device on a route reaching to that router device. Also, when the label switched path is set up at least up to a middle of the target route in this way, the ingress router may carry out the setting of the routing table, etc., under a recognition that the label switched path is set up to the target router device as the egress router.

Since OSPF and MPLS are independent from each other (OSPF area and MPLS domain can be set up independently), there are three distinct cases in terms of relationship between OSPF area and MPLS domain including: (1) the case where OSPF area and MPLS domain are the same, (2) the case where OSPF area is larger than MPLS domain, and (3) the case where there are plural OSPF areas, which will now be described separately.

First, the case (1) in which OSPF area and MPLS domain coincide will be described.

FIG. 1 shows an exemplary network configuration in which OSPF area and MPLS domain coincide.

In the network shown in FIG. 1, there are five routers R1 to R5 within OSPF area (a range indicated by a solid line a1)=MPLS domain (a range indicated by a dotted chain line d1).

Each of the routers R1 to R5 existing within the MPLS network is a label switch router (LSR), while other routers are assumed to be non-LSR.

It is also assumed that a network A and a network B are connected to the router R4 from outside the MPLS domain, while a network C and a network D are connected to the router R5 from outside the MPLS domain.

Here, the case in which the router R1 becomes the ingress router will be considered. Note however that, in practice, any router other than the router R1 can be the ingress router, while on the contrary the router R1 can be the egress router with respect to another ingress router, and as such, which routers are the ingress/egress routers do not affect the essence of the following description so that the case in which the router R1 becomes the ingress router alone will be described in the following.

FIGS. 2A, 2B and 2C show exemplary formats of various information used by the ingress router and concrete examples of their contents. FIG. 2A shows an exemplary egress router list, FIG. 2B shows an exemplary routing table, and FIG. 2C shows an exemplary network list of networks passing through the egress router.

First, with reference to an exemplary label switched path set up procedure at the ingress router shown in FIG. 3, the label switched path set up procedure at the ingress router R1 in a network shown in FIG. 1 will be described (assuming that label switched paths #1 and #2 are not set up yet).

Note that, in this first embodiment, the ingress router R1 recognizes a topology of routers within the same OSPF area and a router or a network that is connected beyond the egress router from the OSPF routing information that is transferred between routers according to the OSPF protocol.

At the router R1, router IDs of the routers R4 and R5 are set in advance as the egress router information as shown in FIG. 2A. Also at this point, the routing table (FIG. 2B) and the network list (FIG. 2C) of networks passing through the egress router are assumed to be empty.

Suppose now that the router R1 has recognized the router R2 according to the OSPF routing information. Then, according to the procedure of FIG. 3, it is ascertained that the router R2 is not in the egress router list (FIG. 2A) (Step S101 NO). Next, the procedure proceeds to the step S104 where the network list of networks passing through the egress router is to be updated, but no egress router has been found yet at this point, so that nothing is done. Also, as the network list is not updated, nothing is done at the step S105 either.

Next, suppose that the router R1 has recognized the router R3 according to the OSPF routing information. The same operation as described above for the router R2 will then be carried out for the router R3 as well.

Next, suppose that the router R1 has recognized the router R4. By referring to the egress router list (FIG. 2A), it can be ascertained that the router R4 is the egress router (step S101 YES). Consequently, a label switched path is formed for the router R4 (by an LDP control unit 10 of an exemplary configuration to be described below) (step S102). In the example shown in FIG. 1, the label switched path #1 is formed.

Then, this label switched path (#1) is added to the network list (FIG. 2C) (step S103). Here, information on a set of egress router=R4, Network=R4, and LSP=#1 is described therein.

Next, it can be ascertained that a network that passes through the egress router R4 is the router R4 according to the OSPF routing information (step S104), so that the fact that the router R4 is reachable by the label switched path (#1) is written into the routing table (FIG. 2B) (step S105). Here, information on a set of destination=R4 and LSP=#1 is described therein.

Next, suppose that the router R1 has recognized the network A. By referring to the egress router list (FIG. 2A), it can be ascertained that the network A is not the egress router (Step S101 NO), so that the network list (FIG. 2C) is updated according to the OSPF routing information. Here, it can be ascertained that the network A passes through the egress router R4 according to the OSPF routing information, so that the network A is added to a Network item corresponding to the egress router=R4 in the network list. Also, as the network A is added to the entry of the router R4 in the network list, a correspondence between the network A and the label switched path number #1 destined to the router R4 is written into the routing table.

Respective settings are made by respective procedures similar to the above for another network B that is connected to the router R4, another egress router R5, and two networks C and D that are connected to this egress router R5.

The final contents of the routing table and the network list in this example are as shown in FIG. 2B and FIG. 2C respectively.

Then, the ingress router R1 searches for packets to be transferred by the label switched path according to this routing table. By looking at the destination of a packet, a packet that is described in this routing table will be transferred by the corresponding label switched path.

As described, according to this first embodiment, the label switched paths with respect to the egress node can be aggregated into one, in contrast to the conventional method which has plural label switched paths with respect to the egress node, so that the number of label switched paths can be reduced.

In the above, a method for generating the label switched path and a method for setting up the packet flow to flow through the label switched path have been described. Next, a method for deleting the network or the egress router will be described.

Figure 4:
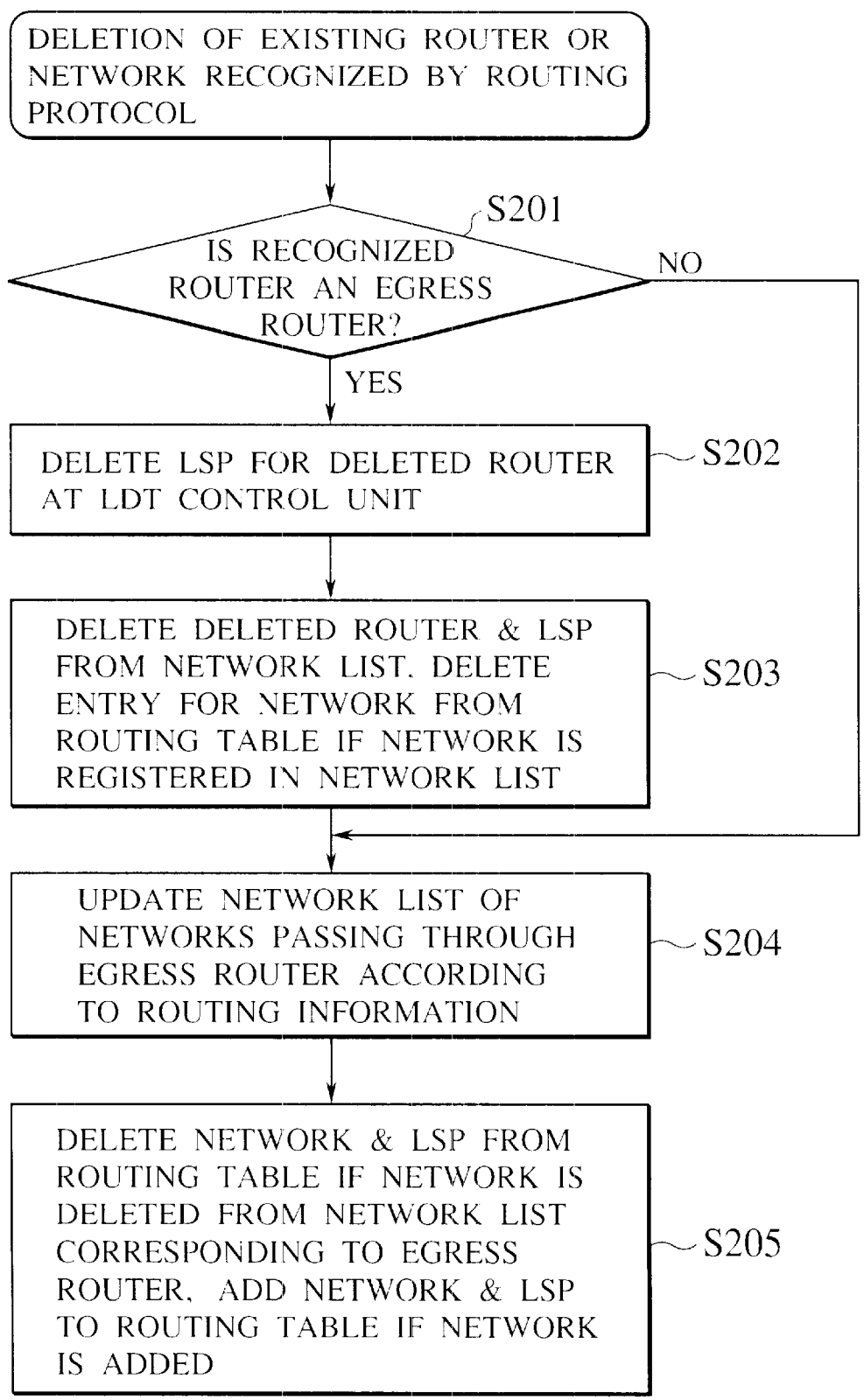
FIG. 4 is a flow chart showing an exemplary deletion procedure at a router device that is an ingress router in the network configuration of FIG. 1.

FIG. 4 shows an exemplary deletion procedure in this case.

First, the network deletion processing will be described. Here, an exemplary case of deleting the network A in a state where label switched paths #1 and #2 are set up in FIG. 1 will be described.

The router R1 recognizes that the network A has been deleted according to the OSPF routing information. Then, whether the recognized router is the egress router or not is checked at the step S201. In this case, it is not the egress router so that the processing proceeds to the step S204. Here, it can be ascertained that the network A has been deleted according to the OSPF routing information so that the network A registered in the network list is deleted (step S204). Then, the item of the network A is deleted from the routing table (step S205).

Next, the egress router deletion processing will be described. Here, an exemplary case of deleting the router R5 in a state where label switched paths #1 and #2 are set up in FIG. 1 will be described.

The router R1 recognizes that the router R5 has been deleted according to the OSPF routing information. Since the router R5 is the egress router (step S201 YES), the label switched path to the router R5 is deleted (by an LDP control unit 10 in an exemplary configuration to be described below) (step S202). Then, the deleted router R5 and label switched path (#2 in the example of FIG. 1) are deleted from the network list.

Next, a route to the router R5 is deleted from the routing table. In addition, the networks C and D that are reachable from the router R5 are also deleted from the network list. Also similarly as done for the router R5, routers to the networks C and D are also deleted from the routing table (step S203).

Next, the network list is updated at the step S204, but in the case where the router R5 is deleted in this network, there is no change in the network route after the router R5 and the networks C and D are deleted so that nothing is done here. Similarly nothing is done at the step S205 either.

Figure 3:
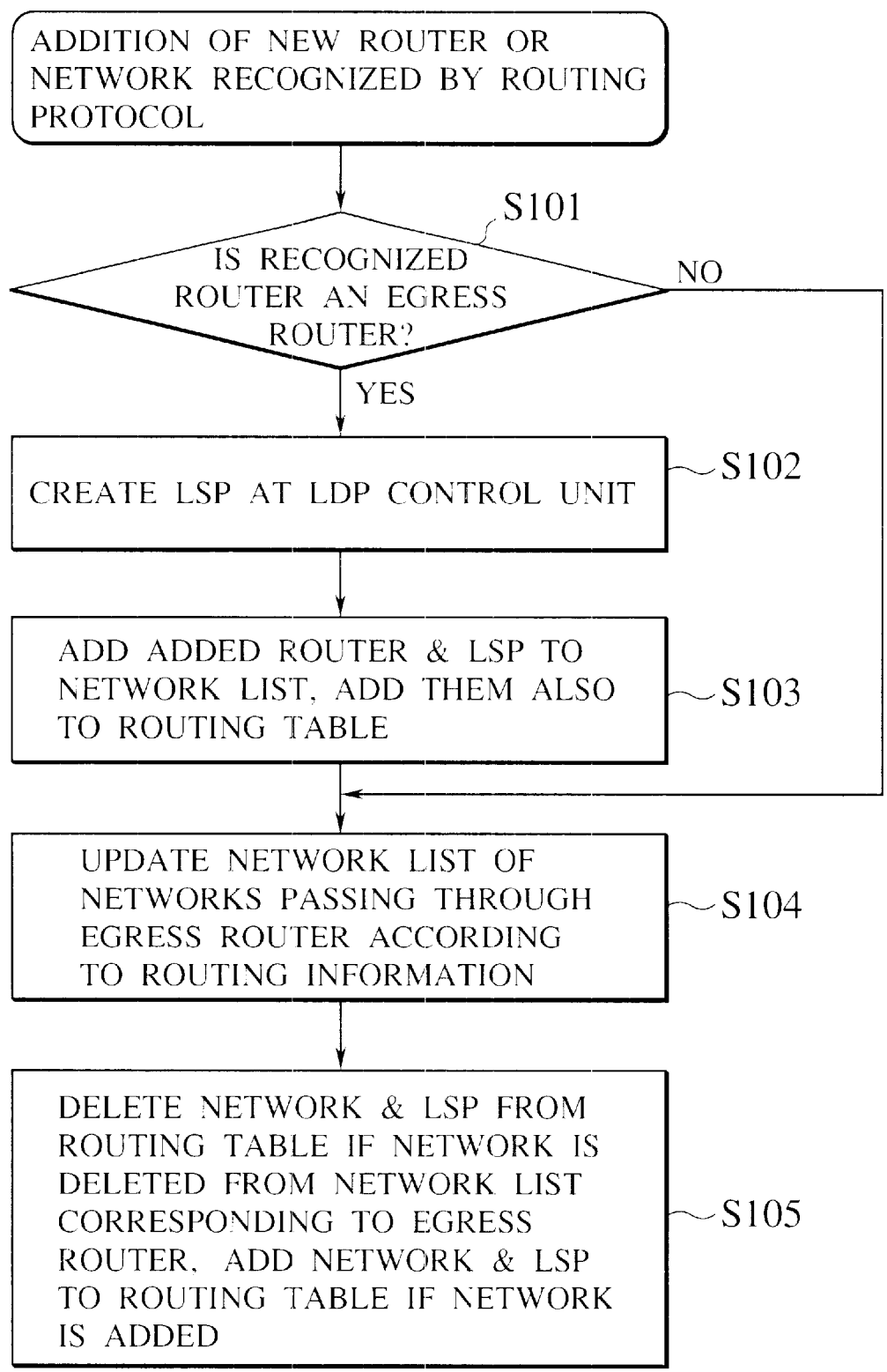
FIG. 3 is a flow chart showing an exemplary set up procedure at a router device that is an ingress router in the network configuration of FIG. 1.

Note that the processing at the step S105 of the set up procedure of FIG. 3 involves a processing for deleting an LSP corresponding to a network from the routing table when this network is deleted from the network list corresponding to the egress router at the network list updating at the step S104, and the processing at the step S204 of the deletion procedure of FIG. 4 involves a processing for adding an LSP corresponding to a network to the routing table when this network is added to the network list corresponding to the egress router, and these processings are to be carried out in the case where there is a need to delete another already set up label switched path at a time of setting up a label switched path or the case where there is a need to set up another label switched path at a time of deleting an already set up label switched path, that is, the case where the route change occurs to be specific, for example.

Now, the internal configuration of the ingress router will be described.

Figure 5:
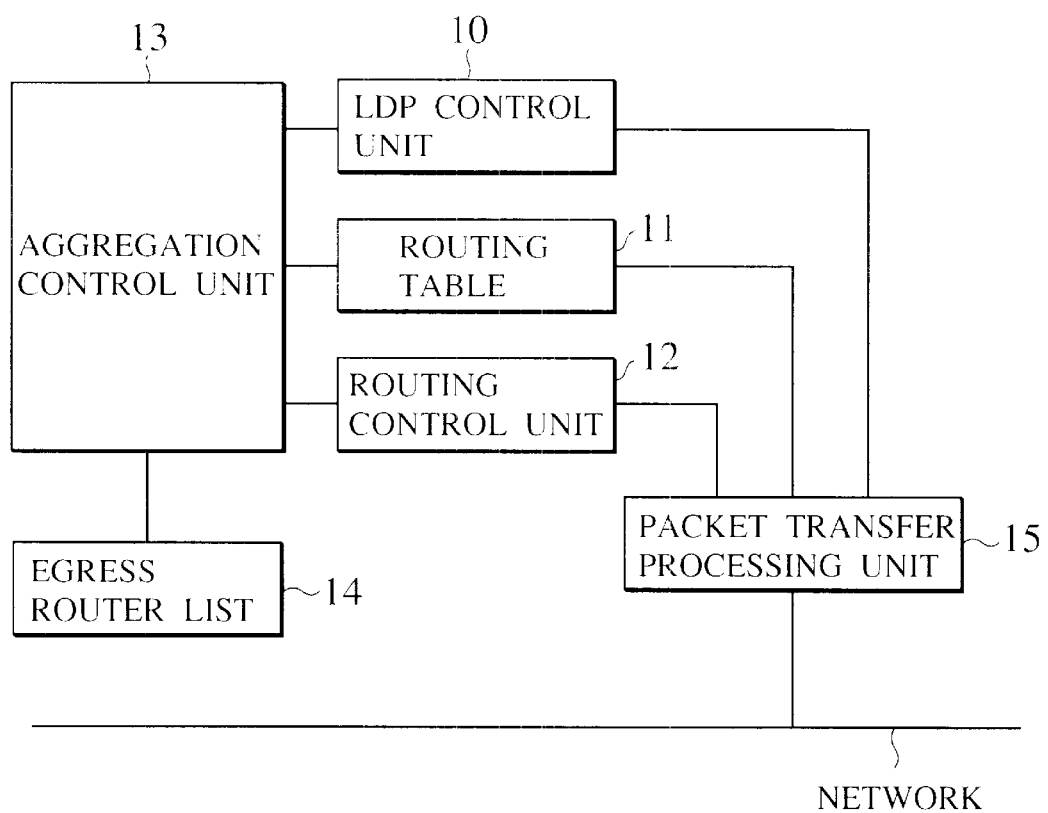
FIG. 5 is a block diagram showing an exemplary configuration of a router device according to the present invention.

FIG. 5 shows an exemplary schematic configuration of the ingress router. Note that this exemplary configuration also serves as an exemplary configuration of the ingress router in the second and third embodiments to be described below.

As shown in FIG. 5, this router comprises an LDP control unit 10, a routing table 11, a routing control unit 12, an aggregation control unit 13, an egress router list 14, and a packet transfer processing unit 15.

The packet transfer unit 15 carries out the layer 3 packet transfer processing. For example, an input data packet is transmitted to a prescribed label switched path according to the routing table 11. Also, control packets for the LDP control unit 10 and the routing control unit 12 are exchanged with neighboring routers.

The routing control unit 12 is a unit for operating a routing control protocol (which is OSPF in the first embodiment, BGP in the second embodiment, and OSPF and BGP in the third embodiment), which carries out a processing for transmission and reception of control messages related to the routing control and a management of the routing table 11 that stores routing information to be managed according to the routing control protocol. The routing table 11 is as shown in FIG. 2C for example.

The LDP control unit 11 is a unit for operating an LDP (Label Distribution Protocol; see L. Andersson, et al., "LDP Specification", Internet Draft draft-ietf-mpls-ldp-01.txt, August 1998), which carries out a processing for transmission and reception of control messages related to the label switched path control (set up/release, neighbor recognition, etc.), and a processing related to label switched path state management and set up/release control.

The aggregation control unit 13 is a unit for administering controls related to addition/deletion (set up/release) of a label switched path according to addition/deletion of egress router/network that is recognized from the routing information of the routing control protocol (the OSPF routing information in the first embodiment) and the egress router list 14 and updating of the routing list 11 or network list (now shown in FIG. 5) for that purpose. The egress router list 14 is as shown in FIG. 2A for example. The network list is as shown in FIG. 2B for example.

For instance, when the fact that the egress router registered in the egress router list 14 is recognized from the routing control unit 12 is notified (which is recognized according to the OSPF routing information in the first embodiment), the aggregation control unit 13 commands the LDP control unit 10 to set up a label switched path up to the egress router.

The LDP control unit 10 that is commanded to set up a label switched path then sets up a label switched path using the LDP for the purpose of the label switched path set up.

When the label switched path set up is completed, the aggregation control unit 13 obtains networks that are located beyond the egress router from the routing control unit 12, and carries out the registration of the network information that is to flow through the label switched path into the routing table 11.

The actual packet transfer is carried out by comparing a destination address of a packet with the routing table 11 and using a matched label switched path.

Next, the case (2) in which OSPF area is larger than MPLS domain will be described.

Here, the set up procedure at the ingress router, the deletion procedure at the ingress router, and the configuration of the ingress router are the same as described above (FIG. 3 to FIG. 5).

Figure 6:
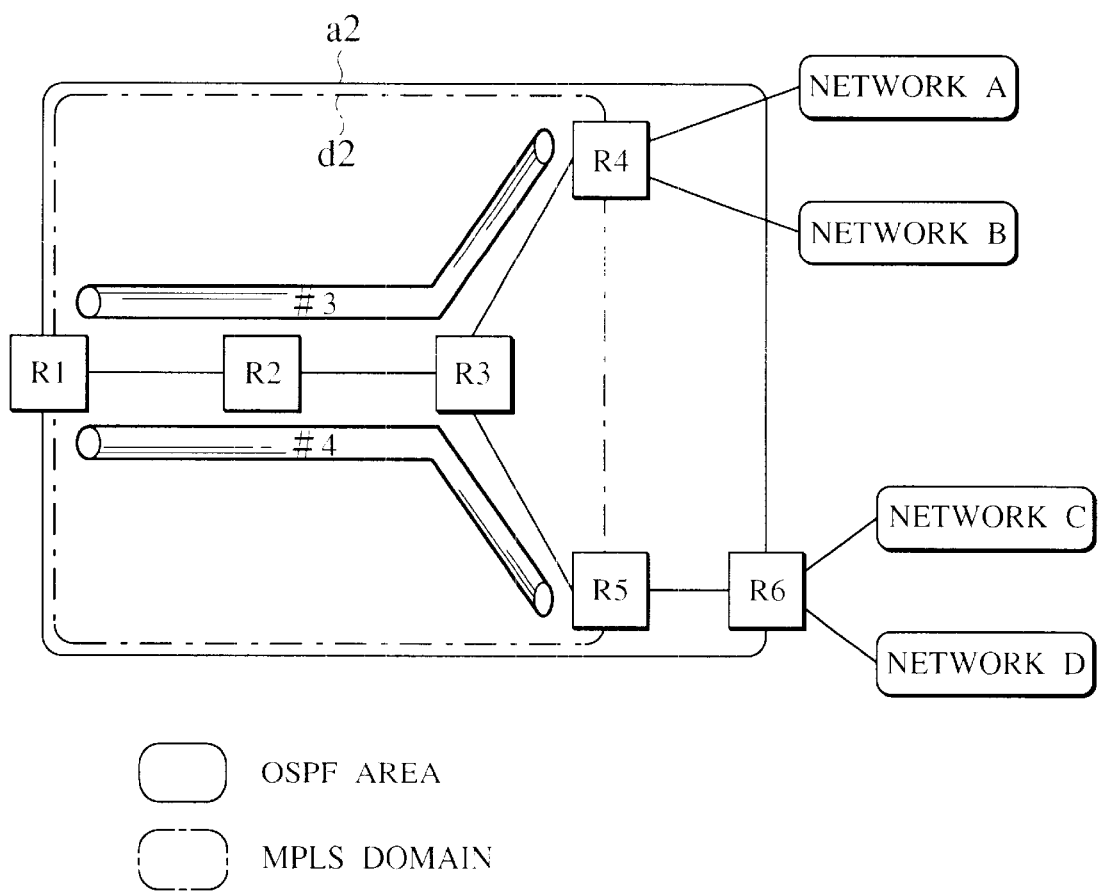
FIG. 6 is a diagram showing a second exemplary network configuration containing a router device according to the first embodiment of the present invention.

FIG. 6 shows an exemplary configuration of a network in which OSPF area is larger than MPLS domain.

In the network shown in FIG. 6, OSPF area (a range indicated by a solid line a2) is larger than MPLS domain (a range indicated by a dotted chain line d2), and routers R1 to R6 are contained in the OSPF area while routers R1 to R5 are contained in the MPLS domain.

It is also assumed that a network A and a network B are connected to the router R4 from outside the MPLS domain, while a network C and a network D are connected to the router R6 from outside the MPLS domain.

Here, the case in which the router R1 becomes the ingress router will be considered again. It is assumed here that the router R4 and the router R5 that are at the border of the MPLS domain are to be registered as the egress routers as shown in FIG. 7A at the ingress router R1 in the situation as described above.

The operation that takes place when the ingress router R1 recognizes the router R4 is the same as in the example of FIG. 1. As a result of this operation, the label switched path (#3) is set up as shown in FIG. 6.

The operation that takes place when the ingress router R1 recognizes the router R5 is different from that of the example of FIG. 1 in that, after the label switched path (#4) is set up with respect to the router R5 which is the egress router, it can ascertained that the destination networks passing through the router R5 are the networks C and D and the routers R5 and R6 so that the router R1 makes a setting to transfer packets to these destination networks through the label switched path that is set up.

The final contents of the routing table and the network list after the set up in this example are as shown in FIGS. 7B and 7C respectively.

The addition/change/deletion of the route is made similarly as in the example of FIG. 1.

Note that in the above the router R4 and the router R5 that are at the border of the MPLS domain are registered as the egress routers at the ingress router R1, but it is also possible to register the router R4 and the router R6 that are at the border of the OSPF area as the egress routers instead.

In such a case, the label switched paths to be set up are the same as in FIG. 6, but the ingress router R1 makes a setting of the list and the table according to the recognition that the label switched paths are set up to the router R4 and the router R6.

Next, the label switched path set up in the case (3) in which there are plural OSPF areas will be described.

Here, the set up procedure at the ingress router, the deletion procedure at the ingress router, and the configuration of the ingress router are the same as described above (FIG. 3 to FIG. 5).

Figure 8:
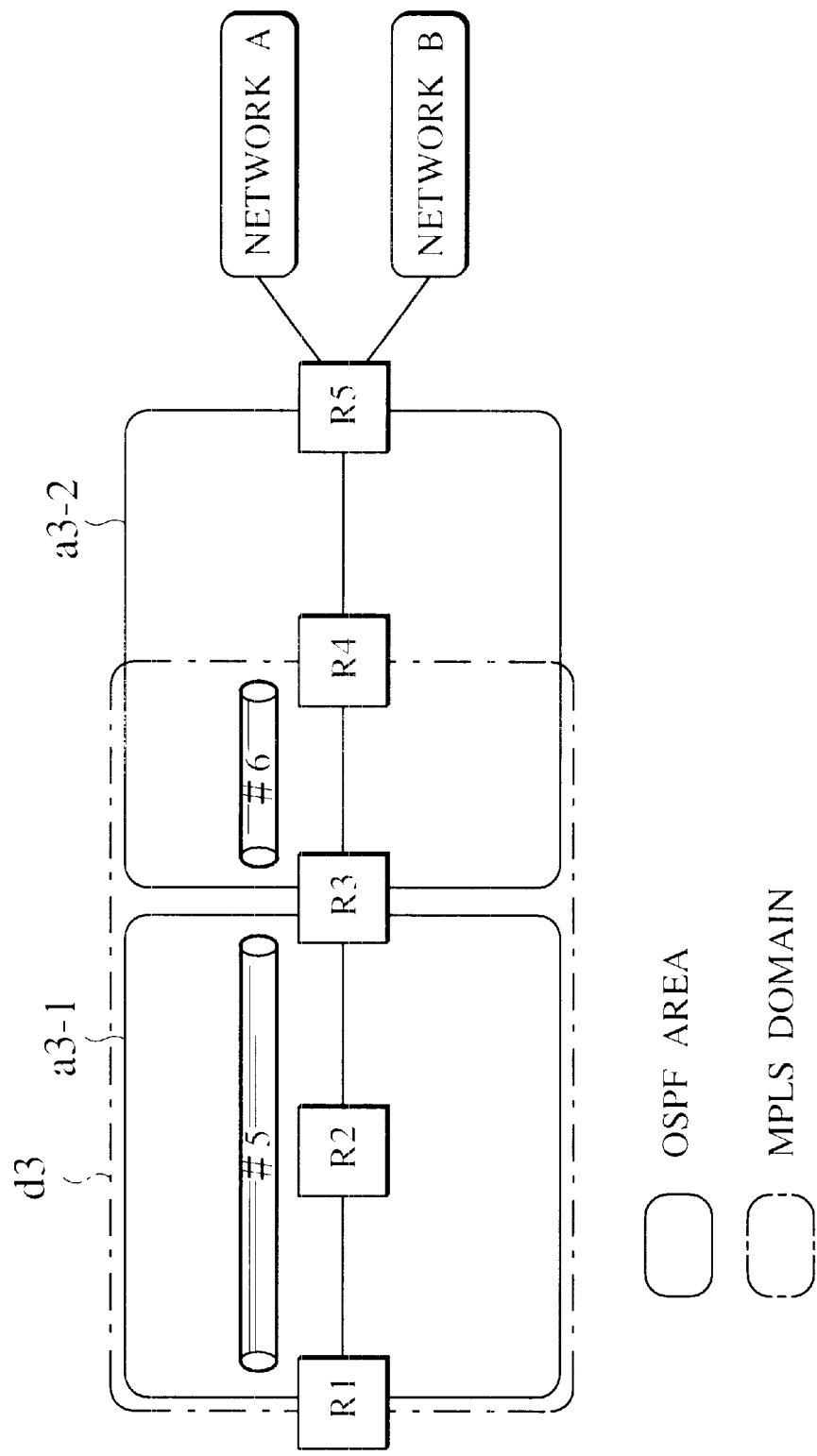
FIG. 8 is a diagram showing a third exemplary network configuration containing a router device according to the first embodiment of the present invention.

FIG. 8 shows an exemplary configuration of a network in which there are plural OSPF areas.

In the network shown in FIG. 8, there are two OSPF areas including an OSPF area (a range indicated by a solid line a3-1) from the router R1 to the router R3 and another OSPF area (a range indicated by a solid line a3-2) from the router R3 to the router R5. In addition, there is also MPLS domain (a range indicated by a dotted chain line d3) which contains a whole of the OSPF area a3-1 and a part of the OSPF area a3-2.

It is also assumed that a network A and a network B are connected to the router R5 from outside the MPLS domain.

Here, the case in which the router R1 of the OSPF area a3-1 becomes the ingress router will be considered first.

In a situation as described above, the router R3 that is at the border of the OSPF area is registered as the egress router at the ingress router R1 as shown in FIG. 9A. Namely, the router R4 is the most egress side router for the MPLS domain d3 but the router R1 which is the ingress router of the OSPF area a3-1 can only recognize routers within the same OSPF area so that the router R3 within the same OSPF area is set as the egress router.

First, the ingress router R1 sets up a label switched path to the router R3. The procedure for this is the same as in the above described examples. Then, the ingress router R1 makes a setting to transfer packets to the networks A and B and the routers R3, R4 and R5 that are networks that are reachable by passing through the router R3, through the label switched path that is set up. In this way, the aggregated label switched path (#5) can be set up from the router R1 to the router R3.

The final contents of the routing table and the network list after the set up in this example are as shown in FIGS. 9B and 9C respectively.

The change or deletion of the route is made similarly as in the case of OSPF within the area.

Note that the case in which the router R3 becomes the ingress router in the OSPF area a3-2 is the same as in the example of FIG. 4. Namely, when the router R3 that is at the border of the MPLS domain is registered as the egress router as shown in FIG. 10A, the label switched path (#6) is set up and the contents of the routing table and the network list become as shown in FIGS. 10B and 10C respectively.

Note also that, in the first embodiment described above, when all of two or more label switched paths that are set up with respect to different egress routers for some network become available because of a configuration of networks to be handled, there is a need to specify only one label switched path for a given destination in the routing table so that only one label switched path to be used has to be selected by some method.

Referring now to FIG. 11 to FIGS. 14A, 14B and 14C, the second embodiment of a router device and a label switched path control method according to the present invention will be described in detail.

In contrast to the first embodiment which uses OSPF, the second embodiment is directed to the aggregation scheme for reducing the number of label switched paths using the routing information of BGP (Border Gateway Protocol) (see Y. Rekhter, T. Li, "A Border Gateway Protocol 4 (BGP-4)", Internet RFC1771, March 1995. In the second embodiment, an address of a correspondent with whom BGP messages are to be exchanged will be utilized for the label switched path set up. By generating one label switched path with respect to a BGP correspondent address from the ingress router, it becomes sufficient to have the number of label switched paths equal to a product of the number of the BGP correspondent routers and the number of ingress label switch routers (LSR) at most.

Here, the set up procedure at the ingress router, the deletion procedure at the ingress router, and the configuration of the ingress router are the basically same as in the first embodiment (FIG. 3 to FIG. 5).

Since BGP and MPLS are independent from each other, there are two distinct cases including: (1) the case where AS (Autonomous System) and MPLS domain are the same (FIG. 11), and (2) the case where MPLS domain exists inside AS (FIG. 13), which will now be described separately.

First, the case (1) in which AS and MPLS domain are the same will be described.

Figure 11:
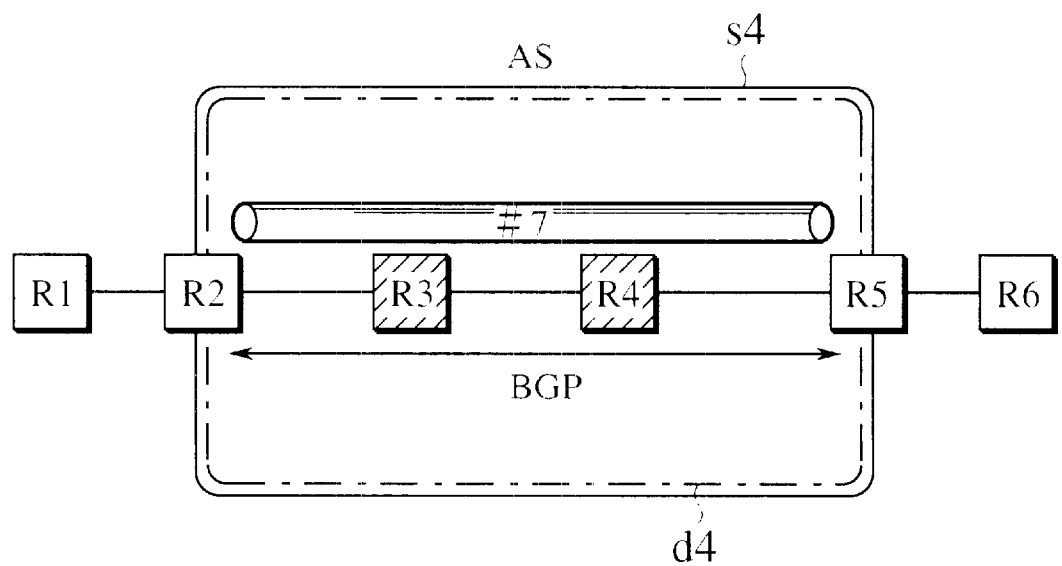
FIG. 11 is a diagram showing one exemplary network configuration containing a router device according to the second embodiment of the present invention.

FIG. 11 shows an exemplary network configuration in which AS and MPLS domain are the same.

In the network shown in FIG. 11, AS (a range indicated by a solid line s4)=MPLS domain (a range indicated by a dotted chain line d4), and routers R2 to R5 are belonging to this same AS, while routers R1 and R6 are belonging to respectively different ASs.

Also, the routers R1, R2, R5 and R6 that are not hatched in FIG. 11 are BGP speakers, and the routers R1 and R2, the routers R2 and R5, and the routers R5 and R6 are respectively talking with each other by BGP.

In the following, the label switched path set up method using the BGP information will be described. Here, the case in which the router R2 becomes the ingress router will be considered.

The router R5 that is a correspondent router with whom the ingress router R2 is talking by BGP is registered as the egress router at the ingress router R2 as shown in FIG. 12A.

After setting up the label switched path (#7) with respect to the router R5, the router R2 changes the routing table so that packets destined to the router R6, that is reachable by passing through the router R5, will be transferred through this label switched path. The networks that are reachable by passing through the router R5 are obtained from the BGP routing information.

The final contents of the routing table and the network list after the set up in this example are as shown in FIGS. 12B and 12C respectively.

Note that, in BGP, information on a destination network, a distance up to there, etc., is obtained from the BGP correspondent router. If the information for the same destination network is received from different BGP correspondent routers, the most preferable router is selected by the ingress router. There are various methods for this router selection, such as a method which selects one with the shortest distance, for example. When the so selected BGP correspondent router through which the destination network passes is ascertained, the destination network that is reachable by passing through that router can be ascertained.

When the router is changed, or the router is added or deleted, the network information to be transferred through the label switched path is changed similarly as in the first embodiment.

Next, the case (2) in which MPLS domain exists inside AS will be described.

Figure 13:
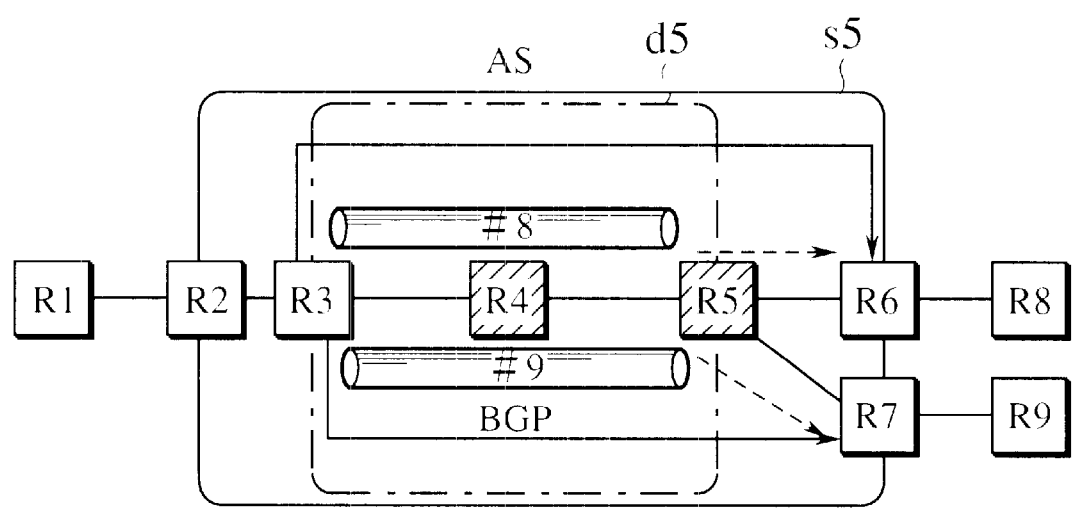
FIG. 13 is a diagram showing another exemplary network configuration containing a router device according to the second embodiment of the present invention.
Figure 13:
Figure 13:

FIG. 13 shows an exemplary network configuration in which MPLS domain exists inside AS.

In the network shown in FIG. 13, MPLS domain (a range indicated by a dotted chain line d5) exists inside AS (a range indicated by a solid line s5), and routers R2 to R7 are belonging to this same AS, while routers R1, R8 and R9 are belonging to respectively different ASs. Among these routers, only routers R3 to R5 are belonging to the MPLS domain.

Also, the routers R1, R2, R3, R6, R7, R8 and R9 that are not hatched in FIG. 13 are BGP speakers, and the routers R1 and R2, the routers R2 and R3, the routers R2 and R6, the routers R2 and R7, the routers R3 and R6, the routers R3 and R7, the routers R6 and R8, and the routers R7 and R9 are respectively talking with each other by BGP.

In the following, the label switched path set up method using the BGP information will be described. Here, the case in which the router R3 becomes the ingress router will be considered.

The routers R6 and R7 that are correspondent routers with whom the ingress router R3 is talking by BGP are registered as the egress routers at the ingress router R3 as shown in FIG. 14A. In this case, the router R5 is a non-BGP speaker that cannot talk by BGP so that it cannot be set as the egress router.

The router R3 is talking with the Routers R6 and R7 by BGP so that it can be ascertained that the routers R6 and R7 are the egress routers. Hence the router R3 carries out the control to set up the label switched path to the router R6 and the label switched path to the router R7, but in the exemplary configuration of FIG. 13, the MPLS domain is only up to the router R5 so that it will end up having two label switched paths set up from the router R3 to the router R5, where one label switched path (#8) is destined to the router R6 and another label switched path (#9) is destined to the router R7.

The network that passes through the router R6 is the router R8 in this example so that the routing table of the ingress router R3 is set to transfer packets destined to the router R8 through the label switched path (#8) destined to the router R6. Also, the routing table of the router R3 is set to transfer packets destined to the router R9 through the label switched path (#9) destined to the router R7.

The final contents of the routing table and the network list after the set up in this example are as shown in FIGS. 14B and 14C respectively.

Note that, in the above example, two label switched paths are set up from the router R3 to the router R5, but it is also possible to avoid this as follows. For example, a router (R5) that has become an actual end point of the label switched path notifies to the ingress router (R3) a message indicating that the label switched path could not have been extended beyond that router to the further downstream side, and upon receiving the above message from the same downstream side router for two or more different label switched paths/ egress routers, the ingress router (R3) recognizes that two or more label switched paths are set up from the own router to that router that notified the above message, so that the ingress router carries out the deletion of the label switched path and the change of the network list/routing table so as to leave only one label switched path from the own router to that router.

Referring now to FIG. 15 and FIGS. 16A, 16B and 16C, the third embodiment of a router device and a label switched path control method according to the present invention will be described in detail.

In contrast to the first embodiment which uses OSPF and the second embodiment which uses BGP, the third embodiment is directed to the label switched path set up method in a network on which both OSPF and BGP are operating.

At the ingress router of the third embodiment, an OSPF corresponding portion and a BGP corresponding portion are basically operated independently. Namely, the ingress router basically has a function of the ingress router of the first embodiment and a function of the ingress router of the second embodiment, and the configuration of the ingress router can be basically the same as that of FIG. 5, except that the routing control unit 12 has an OSPF corresponding portion and a BGP corresponding portion, and that the aggregation control unit 13 controls the set up/deletion of the label switched path by OSPF and the set up/deletion of the label switched path by BGP independently. Also, as in examples shown in FIGS. 16A and 16C, the egress router list and the network list are given in forms in which OSPF and BGP can be distinguished.

Here, two types of label switched paths including a label switched path set up by OSPF and a label switched path set up BGP can potentially exist for a given destination, but there is a need to specify a single label switched path with respect to a given destination in the routing table as in an example shown in FIG. 16B. For this reason, there is provided in advance some selection criterion such as that which gives a higher priority to a label switched path set up by BGP when two types of label switched paths including a label switched path set up by OSPF and a label switched path set up BGP exist for a given destination, for example. This selection processing is carried out at the routing control unit 12 under the control of the aggregation control unit 13, for example.

In the third embodiment, the OSPF corresponding processing and the BGP corresponding processing are to be carried out independently so that the set up procedure at the ingress router and the deletion procedure at the ingress router are basically the same as the first embodiment in the OSPF corresponding portion or as the second embodiment in the BGP corresponding portion, except that the processing of the routing table is slightly different as described above.

In the following, the label switched path set up in the third embodiment will be described.

Figure 15:
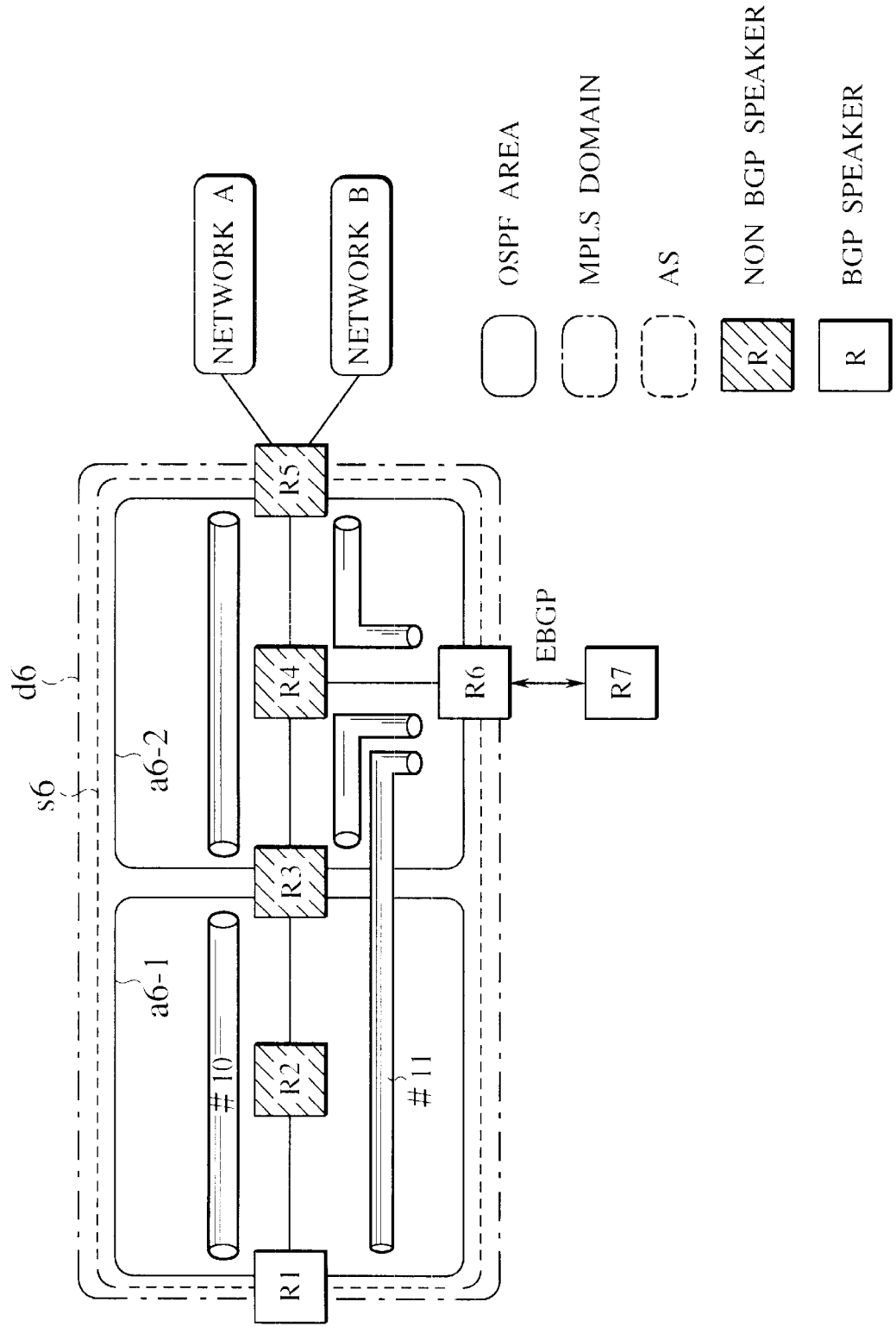
FIG. 15 is a diagram showing an exemplary network configuration containing a router device according to the third embodiment of the present invention.

FIG. 15 shows an exemplary network configuration in which both OSPF and BGP are operating.

In the network shown in FIG. 15, AS (a range indicated by a dash line s6) and MPLS domain (a range indicated by a dotted chain line d6) coincide, and two separate OSPF areas a6-1 and a6-2 exist within them. The routers R1 to R6 are belonging to this same AS which is also the same MPLS domain, where the routers R1 to R3 are belonging to the same OSPF area a6-1 and the routers R3 to R6 are belonging to the same OSPF area a6-2.

In addition, a network A and a network B are connected to the router R5 from outside the MPLS domain, and the router R7 that belongs to another AS is connected to the router R8.

Also, the routers R1, R6 and R7 that are not hatched in FIG. 15 are BGP speakers, where the routers R1 and R6 are talking with each other by IBGP (Internal BGP) while the router R6 and R7 are talking with each other by EBGP (External BGP).

The label switched path using OSPF is to be formed only within the OSPF area so that the label switched paths are formed between the routers R1 and R6, between routers R3 and R5, between the routers R5 and R6, and between the router R6 and R3.

The label switched path using BGP is set up between the routers R1 and R6.

The method for setting up networks to be transferred by these label switched paths are the same as in the first and second embodiments.

Here, the operations at the ingress router R1 are as follows.

The router R3 is registered as the egress router for OSPF at the ingress router R1 as shown in FIG. 16A. In this case, as a result of the processing as in the first embodiment, the label switched path (#10) is set up and the network list for OSPF as shown in FIG. 16C is obtained.

Also, the router R6 which is a correspondent router with whom the ingress router R1 is talking by BGP is registered as the egress router for BGP at the ingress router R1 as shown in FIG. 16A. In this case, as a result of the processing as in the second embodiment, the label switched path (#11) is set up and the network list for BGP as shown in FIG. 16C is obtained.

Here, either one of the label switched path (#10) and the label switched path (#11) can be used as the destination for the routers R6 and R7, but assuming that the label switched path (#11) using BGP is to be given a higher priority here, the resulting routing table at the ingress router R1 becomes as shown in FIG. 16B.

As described, according to the present invention, it is possible to provide a router device and a label switched path control method capable of reducing the number of label switched paths to be set up and thereby making the device implementation easier.

Moreover, it is also possible to realize the reduction of the number of labels by an upstream initiated procedure in which the label allocation starts from an ingress router.

It is to be noted that, in the first to third embodiments, the cases of using OSPF and/or BGP as the routing control protocol have been described, but the present invention is also applicable to the case of using any routing control protocol other than OSPF and BGP. Also, as in the third embodiment in which OSPF and BGP are used in combination, the present invention is applicable to the case of using OSPF or BGP in combination with the other routing control protocol, the case of using the other routing control protocols in combination, and the case of using three or more routing control protocols in combination.

It is also to be noted that the above described embodiments are directed to the cases of using MPLS as the label switching scheme, but the present invention is also applicable to the case of using any other label switching scheme.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each router device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A router device, comprising:

a first memory configured to store a router identification information of a target router to be set as an egress router if possible, at a time of setting up a label switched path from the router device as an ingress router;

a control unit configured to carry out a control to set up the label switched path to the target router stored in the first memory;

a second memory configured to store in correspondence a label switched path identification information of the label switched path set up according to the control by the control unit and an address information to be given to packets that are to be transferred by passing through the target router stored in the first memory; and a routing processing unit configured to carry out a routing processing for the packets according to the label switched path identification information and the address information stored in the second memory.

2. The router device of claim 1, further comprising:

a first registration unit configured to register the label switched path identification information and a router address information of the target router stored in the first memory into the second memory; and a second registration unit configured to register the label switched path identification information and network/router address information of one or a plurality of networks/routers to which the packets are to be transferred via the target router stored in the first memory, into the second memory.

3. The router device of claim 2, wherein the first registration unit carries out registration when the label switched path is set up by the control unit, and the second registration carries out registration when an existence of an addition of a network/router connected to a downstream side of the target router stored in the first memory is recognized according to a prescribed routing control protocol information transferred between the router device and other routers.

4. The router device of claim 2, wherein the control unit also carries out another control to delete the label switched path corresponding to the target router and to update contents of the second memory regarding the label switched path identification information when a deletion of the target router stored in the first memory is recognized according to a prescribed routing control protocol information transferred between the router device and other routers and the control unit also carries out still another control to update a content of the second memory regarding the network/router address information when a deletion of one network/router connected to the downstream side of the target router stored in the first memory is recognized.

5. The router device of claim 1, wherein the control unit starts carrying out the control at a timing where an existence or an addition of a network/router connected to a downstream side of the target router stored in the first memory is recognized according to a prescribed routing control protocol information transferred between the router device and other routers.

6. The router device of claim 1, wherein the target router stored in the first memory is selected to be a router that is located at a border of a range in which an identical routing control protocol operates.

7. The router device of claim 1, wherein the target router stored in the first memory is selected to be a router that is located at a border of a range to which the label switched path can be extended.

8. The router device of claim 1, wherein the target router stored in the first memory is selected to be a router that is located at a border of an overlapping range between a range in which an identical routing control protocol operates and a range to which the label switched path can be extended.

9. The router device of claim 1, wherein the control unit selects one label switched path to be used for transferring those packets which have a specific address information according to a prescribed criterion, and the second memory stores in correspondence the label switched path identification information of said one label switched path and the specific address information, when it becomes possible to transfer those packets which have the specific address information by using any one of a plurality of label switched paths that are set up according to the control by the control unit.

10. A label switched path control method at a router device, comprising the steps of:

(a) storing, in a first memory a router identification information of a target router to be set as an egress router if possible, in an egress router list, at a time of setting up a label switched path from the router device as an ingress router;

(b) carrying out a control to set up the label switched path to the target router stored in the egress router list;

(c) storing in correspondence a label switched path identification information of the label switched path set up according to the control by the control unit and an address information to be given to packets that are to be transferred by passing through the target router stored in the egress router list, in a routing table, the routing table being separate from the first memory; and (d) carrying out a routing processing for the packets according to the label switched path identification information and the address information stored in the routing table.

11. The method of claim 10, further comprising the steps of:

(e) registering the label switched path identification information and a router address information of the target router stored in the egress router list into the routing table;

(f) registering, in correspondence with the label switched path identification information, network/router address information of one or a plurality of networks/routers to which the packets are to be transferred via the target router stored in the egress router list, into the routing table.

12. The method of claim 11, wherein the step (e) carries out registration when the label switched path is set up by the step (b), and the step (f) carries out registration when an existence or an addition of a network/router connected to a downstream side of the target router stored in the first memory is recognized according to a prescribed routing control protocol information transferred between the router device and other routers.

13. The method of claim 11, wherein the step (b) also carries out another control to delete the label switched path corresponding to the target router and to update contents of the routing table regarding the label switched path identification information when a deletion of the target router stored in the egress router list is recognized according to a prescribed routing control protocol information transferred between the router device and other routers, and the step (b) also carries out still another control to update a content of the routing table regarding the network address information when a deletion of one network/router connected to the downstream side of the target router stored in the egress router list is recognized.

14. The method of claim 10, wherein the step (b) starts carrying out the control at a timing where an existence or an addition of a network/router connected to a downstream side of the target router stored in the egress router list is recognized according to a prescribed routing control protocol information transferred between the router device and other routers.

15. The method of claim 10, wherein the target router stored in the egress router list by the step (a) is selected to be a router that is located at a border of a range in which an identical routing control protocol operates.

16. The method of claim 10, wherein the target router stored in the egress router list by the step (a) is selected to be a router that is located at a border of a range to which the label switched path can be extended.

17. The method of claim 10, wherein the target router stored in the egress router list by the step (a) is selected to be a router that is located at a border of an overlapping range between a range in which an identical routing control protocol operates and a range to which the label switched path can be extended.

18. The method of claim 10, wherein the step (b) selects one label switched path to be used for transferring those packets which have a specific address information according to a prescribed criterion, and the step (c) stores in correspondence the label switched path identification information of said one label switched path and the specific address information into the routing table, when it becomes possible to transfer those packets which have the specific address information by using any one of a plurality of label switched paths that are set up according to the control by the step (b).

19. A computer usable medium having computer readable program code means embodied therein for causing a computer to function as a router device, the computer readable program code means includes:

first computer readable program code means for causing said computer to store in a first memory a router identification information of a target router to be set as an egress router if possible, at a time of setting up a label switched path from the router device as an ingress router;

second computer readable program code means for causing said computer to carry out a control to set up the label switched path to the target router stored by the first computer readable program code means;

third computer readable program code means for causing said computer to store in correspondence in a second memory a label switched path identification information of the label switched path set up according to the control by the second computer readable program code means and an address information to be given to packets that are to be transferred by passing through the target router stored by the first computer readable program code means; and fourth computer readable program code means for causing said computer to carry out a routing processing for the packets according to the label switched path identification information and the address information stored in the second memory by the third computer readable program code means.

20. The router device of claim 8, wherein the identical routing control protocol is Open Shortest Path Fast (OSPF) protocol, wherein the range to which the label switched path can be extended corresponds to a multi-protocol label switching (MPLS) domain, and wherein the ingress router recognizes a topology of routers within a same OSPF area and a router or a network that is connected beyond the egress router from OSPF routing information that is transferred between routers according to the OSPF protocol.

* * * * *